B. DEAN.
Meat Slicer.
No. 25,954.
Patented Nov. 1, 1859.
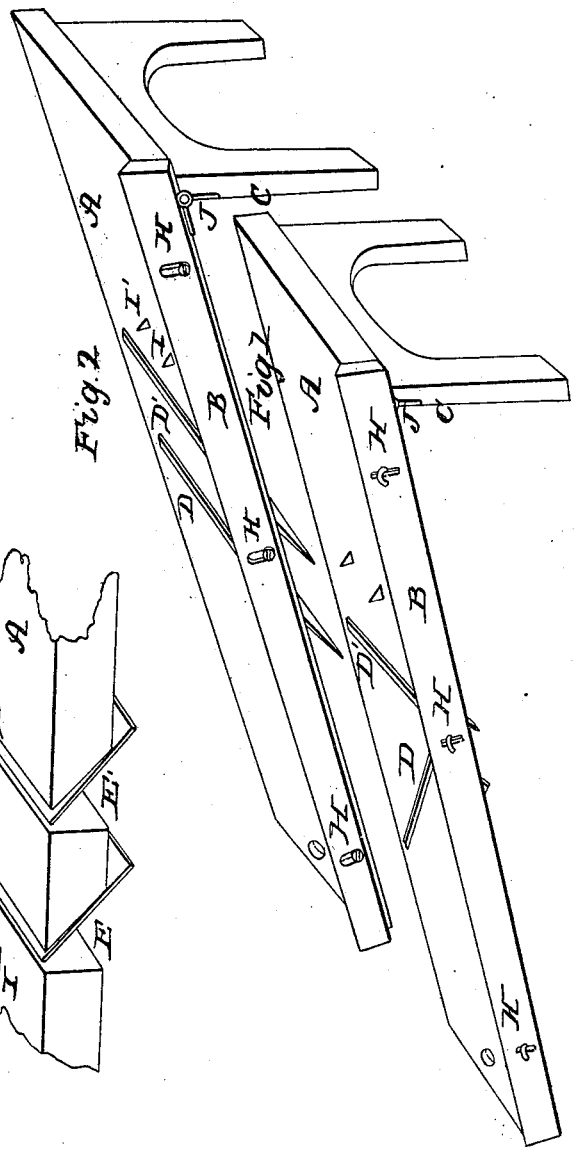
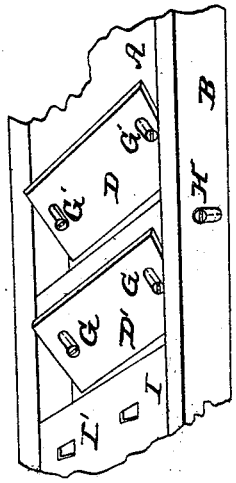
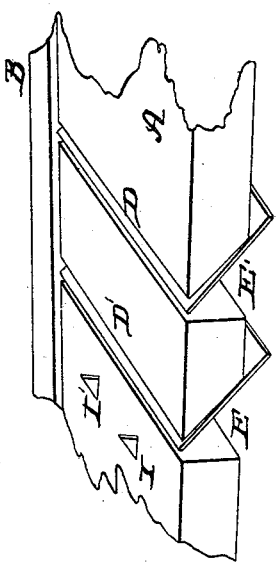
WITNESSES
Geo. C. Bartlett
W. Dent
INVENTOR
Bradford Dean

UNITED STATES PATENT OFFICE.

BRADFORD DEAN, OF CLAYVILLE, NEW YORK.

MEAT-SLICER.

Specification of Letters Patent No. 25,954, dated November 1, 1859.

*To all whom it may concern:*

Be it known that I, BRADFORD DEAN, of Clayville, in the county of Oneida, in the State of New York, have invented a new and Improved Apparatus for Slicing and Ribboning Dried Meat; and I do hereby declare that the following is a full and exact description thereof, reference being had to the accompanying drawing and to the letters of reference marked thereon, the same letters referring to the same parts in each figure.

Figure 1 is a perspective view of the apparatus when ready for use. Fig. 3 is a view of the bottom side, and Fig. 4 a perspective view with one side removed to better show the position of the knives D and D'.

To enable any one skilled in such apparatus to make and use the same I will proceed to describe it as follows:

Letter A is a board or other suitable material of any desired size with a pair of legs C attached to one end by a hinge as seen at J Fig. 1 for the purpose of raising up and supporting one end of the same. In board A are set one or more knives D and D' in a beveled and angular position and secured by screws passing through slots as seen at G and G' Fig. 3 allowing the knives to be varied as circumstances may require, also one or more knives as seen at I and I' in each figure in an upright position.

Attached to board A is a beveled gage or guide letter B Fig. 1 which is raised or lowered by screws passing through slots as seen at H Fig. 1, the whole being made substantially as shown and described. The knives D and D' can be placed in a beveled and angular position as shown in Fig. 1 or as shown in Fig. 2.

What I claim and desire to secure by Letters Patent is—

The arrangement of the knives I and I', knives D and D' and the adjustable guide B as shown and described substantially as and for the purpose specified.

BRADFORD DEAN.

Witnesses:
GEO. C. BARTLETT,
W. DENT.